Nov. 4, 1941.   F. KESSELRING   2,261,686
CIRCUIT INTERRUPTER
Filed Dec. 17, 1938   2 Sheets-Sheet 1
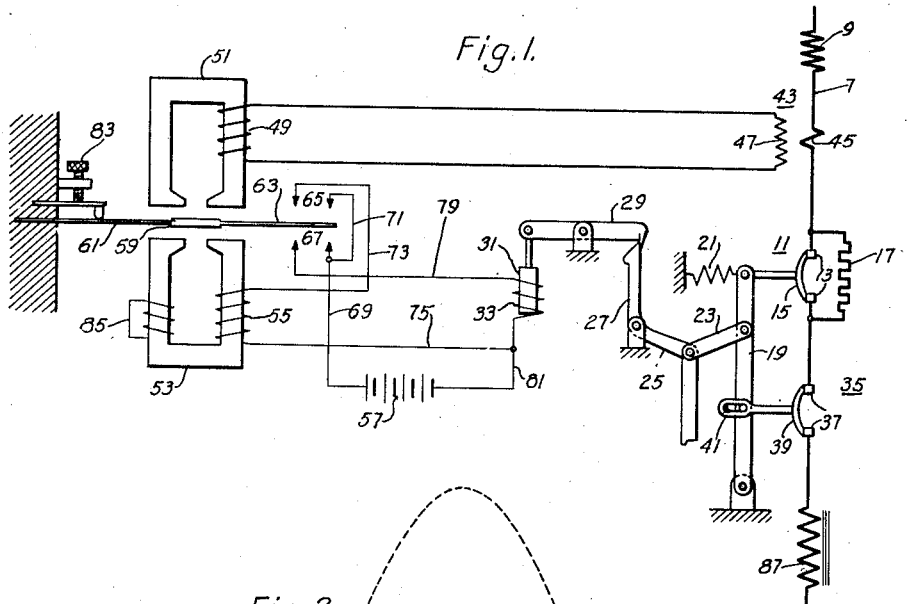
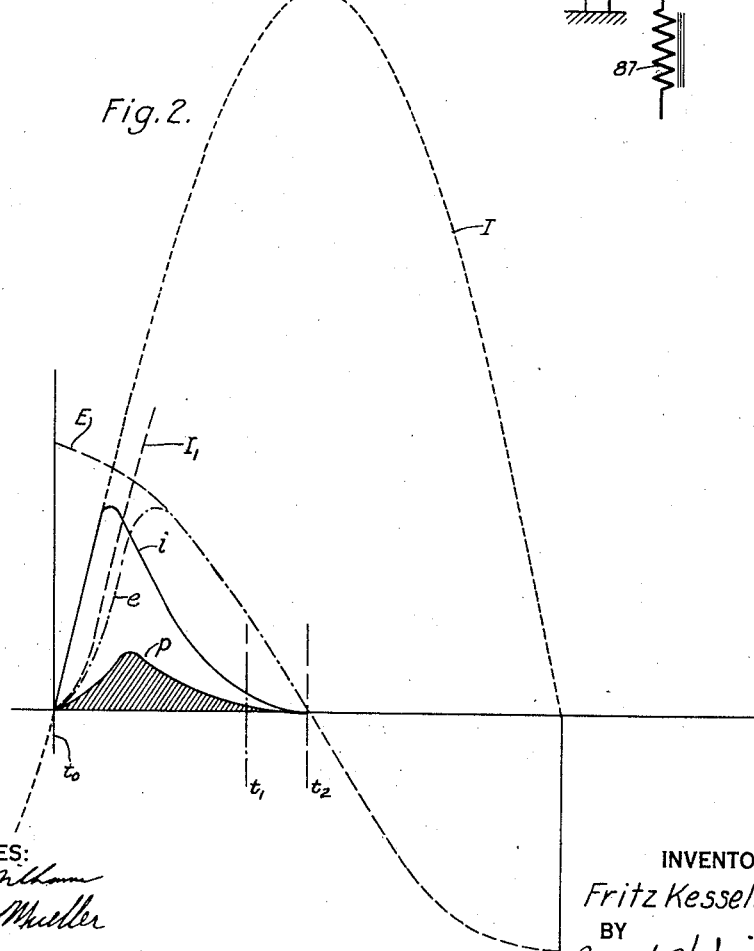
WITNESSES:
Fred C. Milham
Walter E. Mueller
INVENTOR
Fritz Kesselring
BY
Ralph H. Swingle
ATTORNEY Nov. 4, 1941.    F. KESSELRING    2,261,686
CIRCUIT INTERRUPTER
Filed Dec. 17, 1938    2 Sheets-Sheet 2
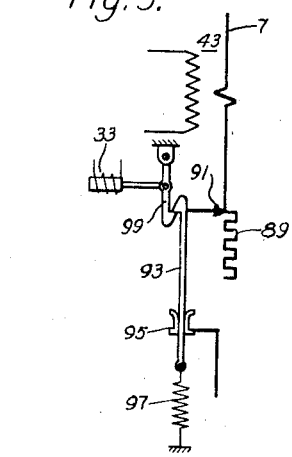
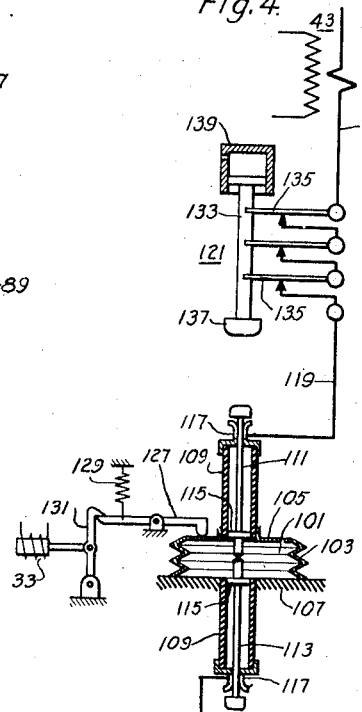
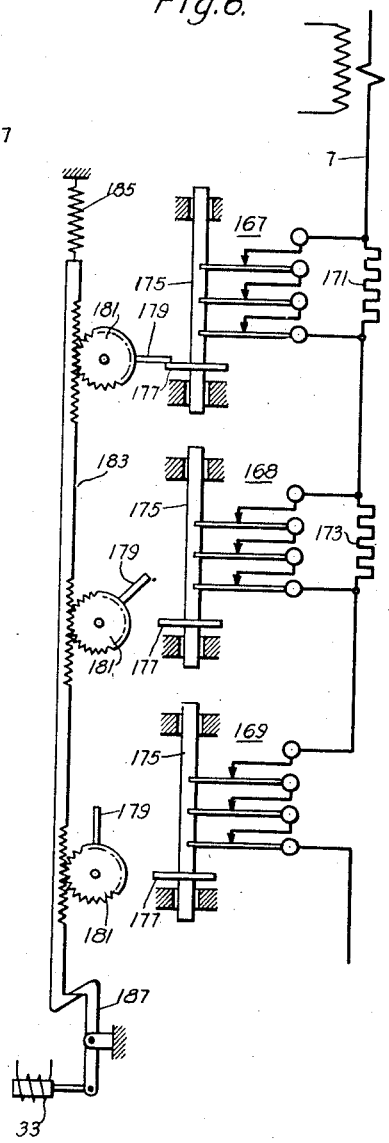
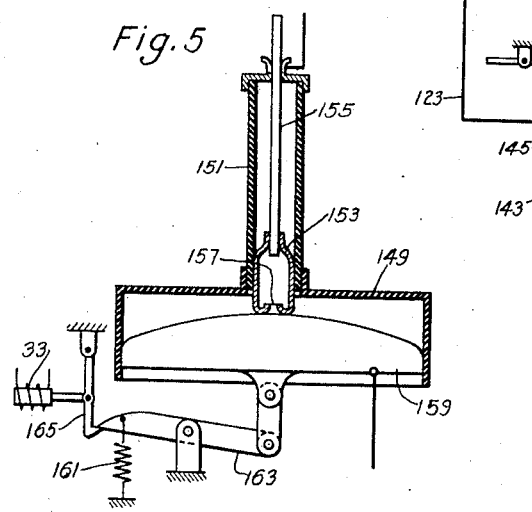
WITNESSES:
INVENTOR
Fritz Kesselring
BY
ATTORNEY Patented Nov. 4, 1941

2,261,686

UNITED STATES PATENT OFFICE 2,261,686

CIRCUIT INTERRUPTER

Fritz Kesselring, Berlin, Germany, assignor to Westinghouse Electric & Manufacturing Company, East Pittsburgh, Pa., a corporation of Pennsylvania Application December 17, 1938, Serial No. 246,418
In Germany December 31, 1937

25 Claims. (Cl. 175—294)

This invention relates to improvements in the regulation and interruption of alternating current circuits and more particularly to the method and apparatus whereby the invention is put into practice.

Heretofore attempts have been made to obtain improved circuit interruption by the insertion of current limiting impedances in the circuit to be interrupted prior to the final circuit opening operation. This method of circuit interruption was found to be undesirable due to the fact that impedances of very large dimensions were required to absorb the large amount of power available in the connected circuit. Furthermore abnormally high voltage surges accompanied the switching-in operation, making switching difficult as well as rendering the impedance subject to insulation failure. The magnitude of these difficulties led circuit breaker engineers to adopt the simple arc drawing circuit breaker as a means to bring about the interruption of an electrical circuit.

The present invention has for its object the provision of means whereby a relatively small essentially ohmic impedance may be utilized to effectively reduce the abnormal current flow in a power circuit to such a value that circuit interruption may be effected by relatively simple switching means substantially unaccompanied by arcing at the switch contacts.

A further object of the invention resides in the provision of means whereby a current limiting resistance may be synchronously connected into the circuit to be interrupted at a predetermined point in the current wave.

Another object of the invention is the provision of means whereby the rate of change of current and the consequent rate of energy absorption by a current limiting resistance at or near the current zero in the circuit to be interrupted is maintained at a minimum value so as to facilitate the switching-in operation of the current limiting resistance.

Still another object of the invention is to provide means for interrupting a high power electrical circuit whereby the current in the circuit is first reduced in a plurality of successive stages to a relatively low value prior to final interruption.

The manner in which the foregoing objects are achieved will appear more fully in the following description when read in connection with the accompanying drawings, in which:

Figure 1 is a schematic circuit diagram showing an embodiment of my invention,

Fig. 2 is a wave form representation of the current, voltage and power relations during the circuit interrupting operation, and Figs. 3 through 6 illustrate, in schematic form, other arrangements for carrying out the principles of my invention.

Referring to Figure 1 of the drawings, the reference number 7 designates a single phase alternating current power circuit of a given reactance schematically shown at 9. An interrupting device is connected in the power circuit and consists of a circuit breaker generally indicated at 11 having fixed contacts 13 and a moving contact 15 bridging the fixed contacts. The fixed contacts 13 are also bridged by a substantially pure resistance 17. The moving contact 15 is carried by a contact arm 19 pivoted at its lower end and biased to the open circuit position by a spring 21. The contact arm 19 is held in the closed circuit position by a toggle linkage 23, 25. The link 25 has an upwardly extending latch arm 27 which is adapted to engage one end of a pivoted latch lever 29. The latch lever 29 is actuated by the armature 31 of a trip coil 33. The means for energizing the trip coil 33 so as to initiate the circuit interrupting operation will appear more fully hereinafter.

In series with the stationary contacts 13 is a second interrupter generally indicated at 35 having fixed stationary contacts 37 and a movable contact 39. The movable contact 39 is actuated through a lost motion connection shown at 41 by the contact arm 19. The operation of the interrupter 35 in connection with the circuit opening operation will appear as the description proceeds.

In accordance with the principles of my invention, the tripping coil 33 is energized at such a point in the current wave in the power circuit to cause the contacts 13 and 15 to separate substantially at current zero, so that the resistance 17 is connected serially in the power circuit at a time when substantially no current is flowing in the circuit. If this switching operation is effected substantially at the time when the current passes through its zero value, substantially no arcing will take place at the contacts 13 and 15 and very little power need be interrupted during the opening operation of the interrupter 11. In order to synchronously energize the trip coil 33, any well known arrangement may be provided. In this particular instance, I have used a current transformer 43, the primary 45 being connected in the power circuit 7 and the secondary 47 connected to a magnetizing coil 49 encircling a U- shaped magnet 51. A second U-shaped magnet 53 is disposed in opposed spaced relation with respect to the magnet 51 and is provided with a coil 55 which is adapted to be energized from a direct current potential source such as a battery 57. Disposed between the U-shaped magnets 51 and 53 is an armature 59 carried by a flexible blade 61 mounted at its left-hand end upon a suitable support as shown.

A moving contact element 63 is carried by the armature 59 and is adapted to alternately make bridging engagement with two pairs of contacts 65 and 67. When the armature 59 is attracted by the magnet 51 and moved upwardly so that the moving contact element 63 bridges the contacts 65, an electrical circuit is completed from the battery 57 through the conductor 69, the conductor 71, contacts 65, conductor 73, energizing coil 55 and conductor 75. When the armature 59 is moved downwardly under the influence of the attraction of the magnet 53 so as to cause the moving contact element 63 to bridge the contact 67, the battery 57 is connected by means of the connections 69, 79 and 81 to the trip coil 33, thereby energizing the same, causing it to actuate the armature 31 to trip the latch lever 29 and allow the interrupter 11 to open. More specifically, the operation of the synchronous control is as follows.

Assuming that the arrangement of the system is as shown in Fig. 1 and an overload current of predetermined magnitude appears in the circuit 7, the coil 49 will be energized in accordance with the predetermined current by virtue of its connection to the current transformer 43. Magnet 51 will be energized to attract the armature 59 moving it upwardly and causing the contacts 65 to be bridged by the moving contact element 63. When the contacts 65 are thus bridged, the battery 57 is connected in circuit with the coil 55, thereby energizing the coil so as to magnetize the magnet 53. The magnet 53, being magnetized from a direct current source exerts a steady pull upon the armature 59 but in a direction opposite to the pull exerted by the magnet 51.

Inasmuch as the coil 49 is energized from an alternating current source, the flux flowing in the magnet 51 and consequently the pull thereof will vary in accordance with the sinusoidal variation of the current. Thus as the instantaneous current in the coil 49 approaches zero value, the holding power of the magnet 51 is accordingly decreased. It will, of course, be apparent that at a predetermined time point in the current wave, the force exerted by the direct-current magnet 53 will overcome the holding force of the alternating current magnet 51 and move the armature 59 downwardly so as to cause the moving contact element 63 to bridge the contact 65 and close the circuit from the battery 57 to the trip coil 33. The time point at which release of the armature 59 occurs can be varied within certain limits by means of an adjusting screw 83 which varies the tension upon the supporting blade 61 which may be made to apply more or less tension in the downward direction on the blade 61 so as to assist, in varying degrees, the pull of the direct current magnet 53. A short circuited winding 85 is also provided around the direct current magnet 53 so as to minimize the effects of induced voltage in the coil 55 upon separation of the moving contact element 63 from the stationary contact 65.

Upon energization of the trip coil 33, the interrupter 11 is tripped in the manner previously described and the resistance 17 inserted in the power circuit 7 preferably at or near the current zero in the current wave. With particular reference to Fig. 2, the normal current wave prior to opening of the interrupter 11 is represented by the curve I. Inasmuch as the voltage of the circuit appears substantially across the reactance 9, it may be represented by the curve E shown leading the current I substantially 90°. If the contacts 13 and 15 are separated when the current I is zero, or as shown in Fig. 2 at $t_0$, the current flowing through the resistance 17 will not follow the curve I but will be reduced in magnitude and take the form shown in curve $i$. Since the voltage drop across the resistance 17 is substantially an ohmic drop, it will substantially be in phase with the current $i$, as represented by the curve $e$. The power absorption or square of the current $i$ times the value of resistance 17 is represented by the shaded area under the curve $p$ of Fig. 2.

It will be noted that the value of the residual current $i$ has been materially reduced and the absorption of power by the resistance 17 has been held to a relatively low value so that circuit interruption can now take place without difficulty. The lost motion connection 41 through which the moving contact 39 of the interrupter 35 is actuated is so disposed with respect to movement of the contact arm 19 that the contacts 37, 39 are separated substantially at the next current zero in the wave. The time in which contacts 37 and 39 may be separated is the time interval between $t_1$ and $t_2$, as shown in Fig. 2. It will be noted that at the time $t_1$ the current $i$ has been reduced to a very small value, and since the current and voltage are substantially in phase, very little effort is required to interrupt the circuit during this particular time interval.

In order to assist the switching-in operation of the resistance 17, it is desirable to provide a time delay in the rate of rise of current in the region of current zero. This may be accomplished by the provision of a saturated iron core choke 87 in the power circuit 7. The choke coil 87 is so dimensioned that in the region of current zero its effective reactance is substantially equal to the reactance 9 of the circuit but due to the saturation of the magnetic circuit when appreciable current begins to flow, it has little effect in producing a voltage drop in the connected circuit. The time delay effect in the rise of current when the choke coil 87 is used is shown by the curve $I_1$ in Fig. 2.

In Fig. 3 a modified arrangement is shown for regulating and interrupting a power circuit. In this instance, the power circuit 7 has a variable resistance 89 connected therein, which resistance includes a sliding contact 91 carried by a movable contact rod 93. The contact rod 93 is slidably carried by a support 95 and biased for movement with respect to said support by a spring 97. The contact rod 93 and the sliding contact 91 are held against sliding movement by a pivoted latch member 99, which member, in turn, is adapted to be actuated by the trip coil 33. Synchronous energization of the trip coil 33 may be effected in the manner shown and described in connection with Fig. 1.

When in the normal current carrying position, the sliding contact 91 is in the position shown in Fig. 3. When an overload or other abnormal current condition occurs in the power circuit 7, the trip coil 33 is provided with a tripping impulse so as to release the latch 99 and permit the sliding contact 91 to be moved downwardly substantially at a time of current zero in the current wave. Since the value of resistance inserted at the outset of the movement of the contact 91 is small, the switching operation of the resistor 89 is accomplished without the formation of an arc and with only small energy absorption. It, therefore, follows that the switching-in operation of the resistance need not necessarily start precisely at a current zero in the current wave. Upon release of the contact rod 93 by the latch 99, the actuating spring 97 moves the contact 91 along the resistance 89 at such a rate that the current within the half cycle may increase only a small additional amount.

The length of the resistance 89 and the speed of movement of the contact 91 are also preferably so proportioned that the contact 91 moves beyond the end of the resistance 89 so as to interrupt the circuit substantially at a subsequent current zero in the current wave.

In the interrupting device shown in Fig. 4, a variable resistance consisting of an easily deformable conductor of liquid form is utilized instead of the sliding contact type resistor shown in Fig. 3. In Fig. 4, the variable resistance comprises a partially conducting liquid 101 disposed in a bellows like container 103 having opposite end plates 105 and 107 of insulating material which are movable relative to each other so as to subject the liquid 101 to changes in pressure. An insulating guide tube 109 is secured to each of the wall members 105 and 107. The guide tubes 109, respectively, support two cooperating contact rods 111 and 113. Each of the contact rods has a piston 115 disposed adjacent the cooperating ends thereof and slidably operative within the guide tubes 109. Each of the guide tubes 109 is also provided with a sliding contact and terminal 117 at the outer end thereof to which a circuit connection can be made.

The upper contact terminal 117 is connected by a connector 119 to a multi-break circuit interrupting device, generally indicated at 121, whereas the lower sliding contact terminal 117 is connected by conductor 123 to a disconnect switch generally indicated at 125. The liquid 101 in the casing 103 may be subjected to pressure by means of a pivoted lever 127 urged by the spring 129 to exert a downward force upon the upper wall member 105. The pivoted lever 127 is normally held against applying the force of the spring 129 by a pivoted latch member 131, which latch member is, in turn, controlled by the trip coil 33.

Synchronous energization of the trip coil 33 may in this instance be obtained in the manner previously described in connection with Fig. 1, so as to bring about the application of pressure substantially at the time of current zero in the power circuit to be interrupted. Upon the application of the downward force on the wall member 105, the liquid 101 is subjected to pressure which reacts upon the pistons 115 to cause these pistons and their respective contacts 111 and 113 to move outwardly with respect to the guide tubes 109. As the contacts 111 and 113 separate, the resistance of the intervening liquid 101 is introduced in the power circuit. This resistance also increases in proportion to the separation of the contacts.

The circuit interrupting device 121 has a movable insulating bar 133 for actuating the movable contact elements 135 to the open circuit position. The lower end of the bar 133 is provided with a head 137 disposed in the path of movement of the contact rod 111. Thus as the contact rod 111 approaches the end of its opening stroke, it engages the head 137 to actuate the bar 133 upwardly so as to open the interrupter 121 and thereby interrupt the residual current flowing in the circuit.

A dashpot 139 disposed at the upper end of the insulating bar 133 is employed to arrest the motion of the contact rod 111 during the circuit opening operation of the interrupter 121. The interrupting device 121 is so disposed with respect to the movement of the contact rod 111 that circuit interruption at the interrupting device takes place substantially at a subsequent current zero in the current wave.

The disconnect switch 125 comprises a fixed contact 141 and a movable contact 143 which is carried by a contact arm 145 biased to the open circuit position. Contact arm 145 is latched in the closed position by a pivoted latch member 147, the free end of which is disposed in the path of movement of the contact rod 113. The latch member 147 is so arranged with respect to the contact rod 113 that the contact rod will strike the latch member to release the contact arm 145 subsequent to the actuation of the interrupting device 121 to the open circuit position. The disconnect switch 125 gives the entire interrupting device the requisite potential safety after a circuit interrupting operation.

In Fig. 5 a further form of deformable conductor regulating resistance device is shown. The partially conducting liquid in this instance may be contained in a rather flat cylindrical casing 149, preferable of insulating material having a tubular guide member 151 also of insulating material projecting from the upper end thereof. Adapted to slide within the guide tube 151 is a hollow contact 153 secured to the lower end of a contact rod 155. The lower end of the contact 153 has an opening 157, the edges of which are well rounded, as shown, so as to permit the free flow of liquid into the contact without whirls or eddies. Liquid within the casing 149 is subjected to pressure by a metallic piston 159 which also serves as a contact member and as such normally engages the lower end of the contact 153. The piston 159 is adapted to be moved upwardly by the spring 161 acting through the pivoted lever 163.

The lever 163 is normally held against movement by a pivoted latch member 165 which is controlled by the synchronously energized trip coil 33 in the manner previously described. Upon actuation of the trip coil 33, at such time in the current wave of the circuit to be interrupted that the spring 161 causes the piston 159 to be moved upwardly at or near a current zero in the current wave, liquid within the cylindrical casing 149 will be subjected to pressure causing the hollow contact 153 to be moved upwardly out of engagement with the piston contact 159, thus inserting a resistance of increasing magnitude in the connected circuit. During the application of pressure as a result of upward movement of the piston 159, a portion of the liquid is forced through the opening 157 into the hollow contact 153 and against an air cushion which is formed in the upper end thereof. This air cushion permits maintaining an active layer of conducting liquid capable of carrying considerable current between the contacting surfaces of the hollow contact 153 and the movable piston 159 at the time of separation. Upon the occurrence of only a small throw of the piston 159, the hollow contact 153 is moved upwardly into the insulating tube 151, whereupon the resistance increases in proportion to the contact movement.

It will, of course, be understood that the device shown in Fig. 5 may be used in connection with a circuit interrupter as shown at 121 in Fig. 4 actuated by the moving contact rod 155 for the purpose of interrupting the residual current.

In Fig. 6 is shown an arrangement whereby a plurality of resistance units are successively connected in the power circuit to be interrupted for the purpose of reducing the abnormal current flowing in the circuit in successive steps to a predetermined value before attempting final circuit interruption. In this modification, three circuit interrupters 167, 168 and 169 of the multiple-break type shown in Fig. 4 are arranged for series circuit operation. The interrupters 167 and 168 are respectively bridged by a resistor 171 and 173. Each of the interrupters 167, 168 and 169 has an insulating bar 175 for actuating the movable contact elements to the open circuit position. Each insulating bar 175 has a striker plate 177 which is adapted to be engaged by a separate actuating arm 179 carried by the gear wheels 181. The gear wheels 181 are mounted for simultaneous rotation by a rack bar 183 which is actuated upwardly by a spring 185 and maintained against movement by a pivoted latch member 187.

The latch member 187 is controlled by the trip coil 33 which in this instance may also be synchronously energized in the manner previously described in connection with Fig. 1. Upon the occurrence of predetermined current conditions in the power circuit, the latch 187 is tripped at such a point in the current wave that actuation of the rack bar 183 and the upper arm 179 will cause the interrupter 167 to be opened substantially at current zero so that the resistance 171 will then be inserted in series with the interrupters 168 and 169. The resistance 171 will thus have the effect of reducing the current in the power circuit a predetermined value in accordance with the value of the resistance selected. The gear wheels 181 and the operating arms 179 are so arranged that the interrupter 168 will be actuated to the open circuit position substantially at a subsequent current zero so as to insert the resistance 173 in the connected circuit. By way of example, the interrupter 168 may be actuated to the open circuit position during the time interval $t_1$ to $t_2$, as shown in Fig. 2. The insertion of resistance 173 in the connected circuit further reduces the current flow in the circuit during the second half cycle of the current wave. The actuating mechanism, including the rack bar 183 and the gear wheels 181, is so arranged that the interrupter 169 is operated to the open position substantially at the third subsequent current zero which brings about interruption of the circuit at this point.

It is also within the purview of this invention to utilize resistances for limiting the current in the circuit to be interrupted, that have a positive temperature coefficient. For example, the resistance elements 17 in Fig. 1, 89 in Fig. 3 and 171 and 173 in Fig. 6, may be constructed of Swedish wood, carbon iron or of tungsten. These particular materials have very high temperature coefficients and for this particular reason may be used to advantage. Although no particular type of breaker has been shown for interrupting the residual current in the circuit other than a schematic representation of single and multiple break structures, it is to be understood that breakers of the liquid immersed, air or gas blast and vacuum types may be used for this purpose. In addition to the use of electrolytic liquids to obtain a deformable variable resistance for reducing the current flow in the circuit to be interrupted, pulpy like conducting masses, powder or dust like bodies, as for example, carbon or graphite powder and others, may also be used. Also under certain circumstances, pulpy like masses having positive temperature coefficients can be used. Furthermore, since the energy absorption of the resistance employed to limit the current in the instant invention is maintained at a small value, liquids and electrodes may be employed under certain circumstances which have not shown themselves heretofore to be suitable as proper materials for liquid resistances.

Although I have shown and described specific embodiments of my invention and have designated certain modifications, it is to be understood that the same is for the purpose of illustration and that further changes and modifications may be made by those skilled in the art without departing from the spirit and scope of the appended claims.

I claim as my invention:

1. The method of stopping the flow of current to a load from an alternating current source comprising inserting a resistor in said circuit at substantially current zero in the current wave and subsequently introducing a break in said circuit.

2. The method of stopping the flow of current to a load from an alternating current source comprising inserting a resistor in said circuit at substantially current zero in the current wave and subsequently introducing a break in said circuit substantially at a succeeding current zero.

3. The method of stopping the flow of current to a load from an alternating current source comprising materially increasing the reactance of said circuit in the region of each current zero in the current wave, inserting a resistor in said circuit at substantially current zero in the current wave, and finally introducing a break in said circuit.

4. The method of interrupting an alternating current circuit comprising inserting resistance of predetermined value in said circuit at substantially current zero in the current wave, increasing the resistance in the circuit during at least the first half cycle of current following the insertion of said resistance of predetermined value, and finally breaking the circuit substantially at a subsequent current zero.

5. The method of interrupting an alternating current circuit comprising inserting resistance of predetermined value in said circuit at substantially current zero in the current wave, increasing the resistance in the circuit in proportion to the increase in instantaneous current, and finally breaking the circuit substantially at a subsequent current zero.

6. The method of interrupting an alternating current circuit comprising, inserting resistance of predetermined value in said circuit at substantially current zero in the current wave, increasing the resistance in the circuit in steps of predetermined value substantially at successive current zeros in the current wave, and finally introducing a break in the circuit.

7. Circuit interrupting means comprising separable contacts connected to cut off the flow of current to a load from an alternating current source, a reactance in series with said contacts, a resistor bridging said contacts, said reactance being effective only during a predetermined time interval in the region of current zero of the current wave for controlling the rate of change of the instantaneous value of current in the circuit to be interrupted, and means for opening said contacts during said predetermined time interval in the region of current zero.

8. Circuit interrupting means comprising two sets of separable contacts arranged in series circuit relation, a resistor bridging the first set of contacts, and operating means for causing said first set of contacts to be opened at a predetermined point in the current wave of the circuit to be interrupted and for causing a subsequent opening of the other set of contacts also at a predetermined point in the current wave.

9. Circuit interrupting means comprising a variable resistor, switching means for connecting said resistor in the circuit to be interrupted at a predetermined point in the current wave, means for increasing the resistance in the connected circuit of said resistor from its minimum to its maximum value, and means for disconnecting said resistor from the circuit to be interrupted at a subsequent predetermined point in the current wave, said last named means causing said circuit to be opened upon disconnection of said resistor.

10. In a circuit interrupting device, a confined body of conducting fluid, separable contacts immersed in said fluid, means responsive to pressure upon said fluid for causing said contacts to separate to introduce resistance between said contacts in accordance with the conductivity of the fluid therebetween, and means for synchronously subjecting said body of fluid to pressure for causing said contacts to separate at a predetermined point in the current wave of the current flowing through said contacts.

11. In a circuit interrupting device, a confined body of conducting fluid, separable contacts immersed in said fluid, means responsive to pressure upon said fluid for causing said contacts to separate to introduce resistance between said contacts in accordance with the conductivity of the fluid therebetween, and means for synchronously subjecting said body of fluid to pressure for causing said contacts to separate at a predetermined point in the current wave of the current flowing through said contacts, and switching means actuated in accordance with a predetermined movement of at least one of said contacts for opening the circuit to said contacts at a subsequent predetermined point in the current wave.

12. In a circuit interrupting device, a deformable container filled with conducting fluid, normally restrained resilient means for applying a force to said deformable container to subject the fluid therein to pressure, separable contacts immersed in said container, pressure responsive means for causing said contacts to separate to introduce resistance between said contacts in accordance with the conductivity of the fluid therebetween, and means controlled by the current flowing through said contacts for releasing said resilient means to cause said contacts to separate at a predetermined point in the current wave.

13. In a circuit interrupting device, a deformable container filled with conducting fluid, normally restrained resilient means for applying a force to said deformable container to subject the fluid therein to pressure, separable contacts immersed in said container, pressure responsive means for causing said contacts to separate to introduce resistance between said contacts in accordance with the conductivity of the fluid therebetween, means controlled by the current flowing through said contacts for releasing said resilient means to cause said contacts to separate at a predetermined point in the current wave, and means for interrupting the residual current flowing through said contacts at a subsequent predetermined point in the current wave.

14. In a circuit interrupting device, a cylindrical container filled with conducting fluid, a tubular member communicating with said container, a contact disposed for movement within said tubular member in response to pressure conditions within said container, a piston at least partially of conducting material movable within said container and normally adapted to make contacting engagement with said contact to establish a circuit through said container, normally restrained resilient means for actuating said piston to subject said fluid to pressure and cause said contact to separate from said piston, said fluid upon separation of said contact and said piston causing a decrease in current flow in accordance with the conductivity of said fluid, and means controlled by the flow of current through said contact and piston for releasing said resilient means to cause said piston to be actuated by said resilient means at a predetermined point in the current wave.

15. In a circuit interrupting device, a casing filled with conducting fluid, a pair of separable contacts extending into said casing, means for subjecting said fluid to pressure, means responsive to pressure upon said fluid for causing said contacts to separate and insert the resistance of said fluid between the contacts to decrease the flow of current therethrough, synchronously controlled means for subjecting the fluid in said casing to pressure to cause said contacts to separate at substantially current zero in the current wave, switching means in series with said contacts actuated by a predetermined movement of one of said contacts for interrupting the residual current flow through said contacts substantially at a subsequent current zero, and disconnect switch means also in series with said contacts adapted to be actuated to open circuit position by a predetermined movement of the other of said pair of contacts following operation of said first switching means.

16. In a circuit interrupting device, a plurality of switching units arranged in series circuit relation, a current limiting resistor bridging all except one of said switching units, actuating means for said switching units controlled in accordance with predetermined current conditions in the circuit to be interrupted, and means for synchronously initiating operation of said actuating means to cause said switching units to be opened in succession and substantially at successive current zeros in the current wave, said switching units bridged by said resistors being opened prior to the opening of said remaining unit.

17. The method of controlling an alternating current circuit by increasing the resistance thereof comprising initiating the increase in resistance at substantially current zero in the current wave and thereafter increasing the resistance in proportion to the normal increase in instantaneous current to prevent a substantial rise in instantaneous current during each half-cycle following the initial change in resistance.

18. The method of controlling an alternating current circuit comprising initiating an increase in resistance of said circuit at substantially current zero in the current wave, increasing the resistance of the circuit in proportion to the normal increase in instantaneous current and thereafter breaking the circuit substantially at a subsequent current zero.

19. The method of interrupting an alternating current circuit comprising decreasing the rate of change of instantaneous current over a predetermined time interval in the region of a current zero in the current wave of the circuit, inserting a resistor in the circuit during said predetermined time interval in the region of said current zero, and finally introducing a break in the circuit during a subsequent predetermined time interval in the region of a subsequent current zero.

20. Circuit interrupting means comprising separable contacts, means in circuit with said contacts for decreasing the normal rate of change of instantaneous current during a predetermined time interval in the region of current zero of the current wave in the circuit to be interrupted, means for connecting a resistance in circuit with said contacts during said predetermined time interval in the region of said current zero, and means for separating said contacts during a predetermined time interval in the region of a subsequent current zero.

21. In a circuit interrupter, separable contacts, means for separating said contacts at a predetermined point in the current wave of the circuit being interrupted, deformable conducting means continuously bridging said separable contacts at least over a predetermined time interval during separation thereof, said deformable conducting means normally having a large cross section and low resistance when said separable contacts are in engagement, and means operative to decrease the cross section of at least the bridging portion of said deformable conducting means during separation of said contacts to cause a rapid increase in resistance in the circuit during contact separation.

22. In a circuit interrupting device, a plurality of switch means arranged in series circuit relation, a plurality of current limiting resistors each of which bridge a switch means, operating means for said switching means controlled in accordance with predetermined current conditions in the circuit to be interrupted, and means for synchronously initiating operation of said operating means to cause said switching means to be opened in succession and substantially at successive current zeros in the current wave.

23. A device for controlling an alternating current circuit comprising a substantially pure ohmic resistance, and means for introducing said resistance in said circuit at a predetermined point in the current wave, said resistance automatically increasing in value with an increase in instantaneous current to limit the rise of instantaneous current to a predetermined value following introduction of said resistance.

24. A device for controlling an alternating current circuit comprising a variable resistance and means for inserting said resistance in said circuit at substantially current zero in the current wave, said resistance having a positive temperature coefficient so as to automatically increase in resistivity as the instantaneous current increases following insertion of said resistance.

25. A device for controlling an alternating current circuit comprising a resistance and means for inserting said resistance in said circuit at substantially current zero in the current wave, said resistance having a value greater than the impedance of said circuit at a time at which the resistance is inserted.

FRITZ KESSELRING.